(12) United States Patent
Clearman et al.

(10) Patent No.: US 10,754,229 B2
(45) Date of Patent: Aug. 25, 2020

(54) CAMERA HOUSING

(71) Applicant: GoPro, Inc., San Mateo, CA (US)

(72) Inventors: Christopher Aaron Clearman, Half Moon Bay, CA (US); Rudy Lucas Samuels, Mill Valley, CA (US); Richard Gioscia, Santa Clara, CA (US)

(73) Assignee: GoPro, Inc., San Mateo, CA (US)

(*) Notice: Subject to any disclaimer, the term of this patent is extended or adjusted under 35 U.S.C. 154(b) by 0 days.

(21) Appl. No.: 16/515,342

(22) Filed: Jul. 18, 2019

(65) Prior Publication Data

US 2019/0342473 A1 Nov. 7, 2019

Related U.S. Application Data

(63) Continuation of application No. 15/937,004, filed on Mar. 27, 2018, now Pat. No. 10,511,750, which is a
(Continued)

(51) Int. Cl.
*G03B 17/56* (2006.01)
*G03B 17/02* (2006.01)
(Continued)

(52) U.S. Cl.
CPC ........ *G03B 17/561* (2013.01); *E05B 17/2019* (2013.01); *G03B 17/02* (2013.01); *G03B 17/08* (2013.01); *G03B 17/566* (2013.01)

(58) Field of Classification Search
CPC ......... A45C 11/38; G03B 17/02; G03B 17/08
See application file for complete search history.

(56) References Cited

U.S. PATENT DOCUMENTS

| 1,612,277 A | 12/1926 | Leo |
| 5,092,458 A | 3/1992 | Yokoyama |
| (Continued) |

FOREIGN PATENT DOCUMENTS

| CN | 1740899 A | 3/2006 |
| CN | 100432830 | 11/2008 |
| (Continued) |

OTHER PUBLICATIONS

International Search Report and Written Opinion for International Application No. PCT/US2014/046552, dated Aug. 18, 2014, 7 pages. .

(Continued)

*Primary Examiner* — Clayton E. LaBalle
*Assistant Examiner* — Leon W Rhodes, Jr.
(74) *Attorney, Agent, or Firm* — Young Basile Hanlon & MacFarlane, P.C.

(57) ABSTRACT

A camera housing includes a main body having four sides that form a cavity to receive a camera, a door detachably coupled to the main body, and an exposed area in the main body allowing a user to manipulate a button on the camera or access an I/O or microphone interface of the camera. The camera housing includes an indicator window substantially aligning with a visible indicator on the camera, a latch detachably securing a first side of the door to a first side of the main body; and a hinge coupling a second side of the door to a second side of the main body. The camera housing includes securing protrusions that interlock with corresponding mounting protrusions extending from a camera mount. A front face and a rear face of the camera are exposed when the camera is secured by the door in the camera housing.

20 Claims, 13 Drawing Sheets

Related U.S. Application Data continuation of application No. 15/487,534, filed on Apr. 14, 2017, now Pat. No. 9,930,231, which is a continuation of application No. 14/995,599, filed on Jan. 14, 2016, now Pat. No. 9,628,681, which is a continuation of application No. 14/459,650, filed on Aug. 14, 2014, now Pat. No. 9,268,200, which is a continuation of application No. 13/949,160, filed on Jul. 23, 2013, now Pat. No. 8,837,928.

(51) Int. Cl.
*E05B 17/20* (2006.01)
*G03B 17/08* (2006.01)

(56) References Cited

U.S. PATENT DOCUMENTS

| | | | |
|---|---|---|---|
| 6,138,826 A | 10/2000 | Kanamori |
| 7,060,921 B2 | 6/2006 | Kubo |
| 7,613,386 B2 | 11/2009 | Shimamura |
| 7,801,425 B2 | 9/2010 | Fantone |
| 8,014,656 B2 | 9/2011 | Woodman |
| 8,544,643 B2 | 10/2013 | Yim |
| D699,276 S | 2/2014 | Samuels |
| D699,277 S | 2/2014 | Samuels |
| 8,749,966 B1 | 6/2014 | Boudreau |
| 8,807,849 B2 | 8/2014 | Apter |
| 8,825,124 B1 | 9/2014 | Davies |
| 8,837,928 B1 | 9/2014 | Clearman |
| D724,637 S | 3/2015 | Samuels |
| D724,638 S | 3/2015 | Samuels |
| 9,014,766 B2 | 4/2015 | Hu |
| 9,152,019 B2 | 10/2015 | Kintner |
| 9,161,110 B1 | 10/2015 | Patsis |
| 9,300,345 B2 | 3/2016 | Johnson |
| 2004/0095506 A1 | 5/2004 | Scott |
| 2007/0071423 A1 | 3/2007 | Fantone |
| 2008/0023607 A1 | 1/2008 | Barker |
| 2009/0032420 A1 | 2/2009 | Zenzai |
| 2009/0110380 A1 | 4/2009 | Fantone |
| 2009/0111543 A1 | 4/2009 | Tai |
| 2009/0206077 A1 | 8/2009 | Melmon |
| 2010/0060747 A1 | 3/2010 | Woodman |
| 2011/0064401 A1 | 3/2011 | Desorbo |
| 2011/0147245 A1 | 6/2011 | Yim |
| 2011/0297578 A1 | 12/2011 | Stiehl |
| 2012/0043236 A1 | 2/2012 | Szucs |
| 2012/0133758 A1 | 5/2012 | Foss |
| 2012/0262618 A1 | 10/2012 | Weakly |
| 2013/0057758 A1 | 3/2013 | Woodman |
| 2013/0082963 A1 | 4/2013 | Chu |
| 2013/0250134 A1 | 9/2013 | McCauley |
| 2013/0324189 A1 | 12/2013 | Katis |
| 2013/0331976 A1 | 12/2013 | Freeman |
| 2014/0069824 A1 | 3/2014 | Kalashnikov |
| 2014/0099093 A1 | 4/2014 | Johnson |
| 2015/0180527 A1 | 6/2015 | Fathollahi |
| 2015/0264226 A1 | 9/2015 | Gafni |
| 2015/0288892 A1 | 10/2015 | Frank |
| 2016/0219202 A1 | 7/2016 | Barros |
| 2017/0060184 A1 | 3/2017 | Ranetkins |

FOREIGN PATENT DOCUMENTS

| | | |
|---|---|---|
| CN | 201796220 U | 4/2011 |
| CN | 202353622 U | 7/2012 |
| WO | 2010005975 A1 | 1/2010 |

OTHER PUBLICATIONS

Supplementary European Search Report for European Patent Application No. EP 14829354, dated Aug. 16, 2016, 6 Pages.

United States Office Action, U.S. Appl. No. 14/459,650, dated Jun. 10, 2015, 7 pages.

CAMERA HOUSING

CROSS REFERENCE TO RELATED APPLICATIONS

This application is a continuation of U.S. application Ser. No. 15/937,004, filed Mar. 27, 2018, which application is a continuation of U.S. application Ser. No. 15/487,534, filed Apr. 14, 2017, now U.S. Pat. No. 9,930,231, which application is a continuation of U.S. application Ser. No. 14/995,599, filed Jan. 14, 2016, now U.S. Pat. No. 9,628,681, which application is a continuation of U.S. application Ser. No. 14/459,650, filed Aug. 14, 2014, now U.S. Pat. No. 9,268,200, which application is a continuation of U.S. application Ser. No. 13/949,160, filed Jul. 23, 2013, now U.S. Pat. No. 8,837,928, all of which are incorporated by reference in their entireties.

BACKGROUND

Technical Field

This disclosure relates to a camera system, and more specifically, to a housing for a camera.

Description of the Related Art

Digital cameras are increasingly used in outdoors and sports environments. In order to allow for the safe use of cameras in such environments, the cameras need to be secured to camera mounts, which in turn can be secured to, for example, sports equipment, vehicles, or a user. One such means for securing a camera to a camera mount is a camera housing that securely encloses or partially encloses a camera. A camera housing can include means for coupling to a camera mount, allowing a user to mount a secured camera during use of the camera. A user's experience with a camera housing can be diminished by difficult or complicated mechanisms for securing a camera within or removing a camera from the camera housing. In addition, the user's experience can be further complicated if the camera housing must be decoupled from the camera mount before a camera can be secured within or removed from the camera housing.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

A camera system includes a camera and a camera housing structured to at least partially enclose the camera. The camera includes a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing can include a lens window structured on the front surface of the camera housing and configured to substantially align with the camera lens, and can include one or more indicator windows structured on the front surface of the camera housing and configured to substantially align with the camera indicators.

Figure 1A:
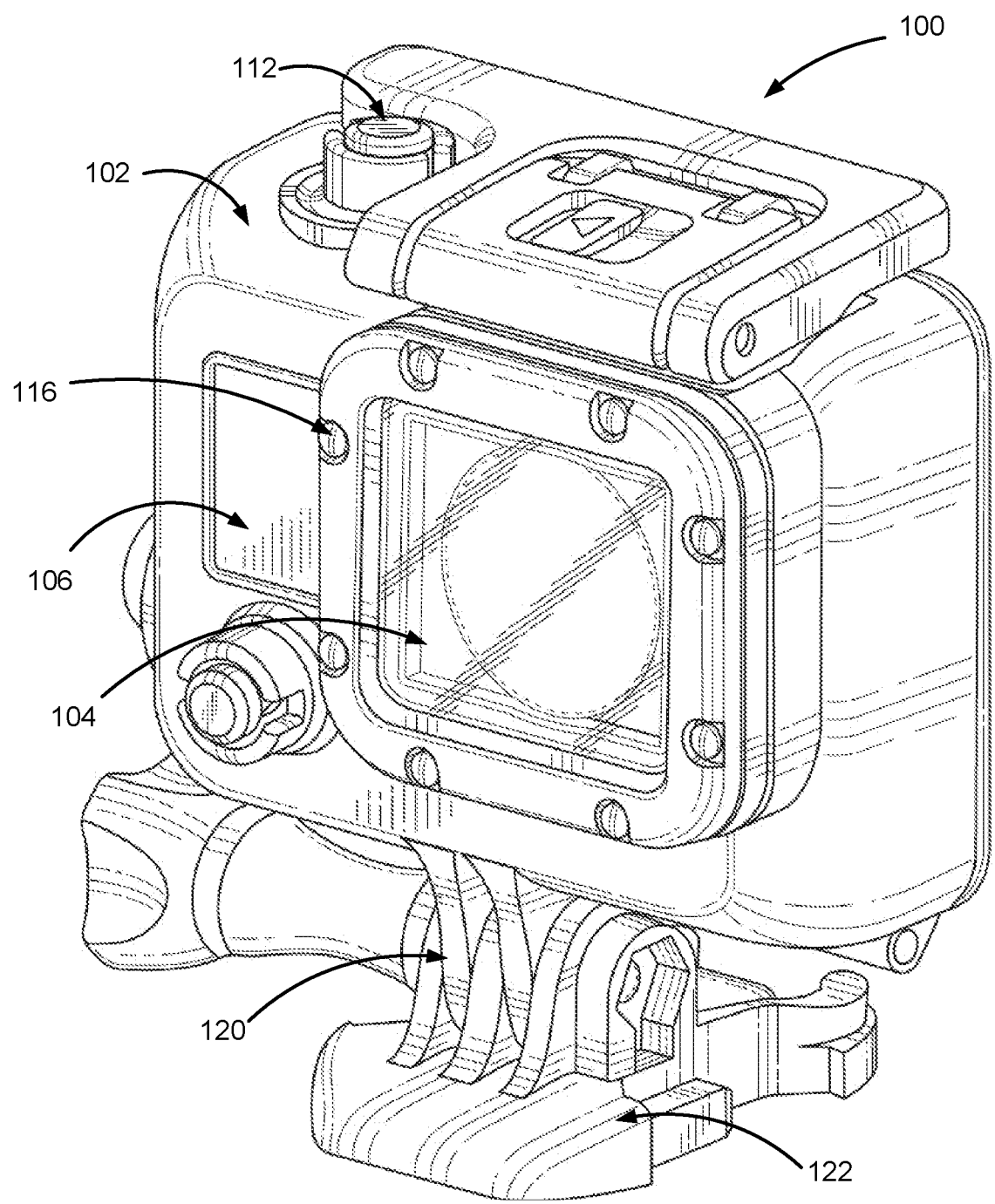
FIG. 1a illustrates a perspective view of a camera system, according to one embodiment.
Figure 1B:
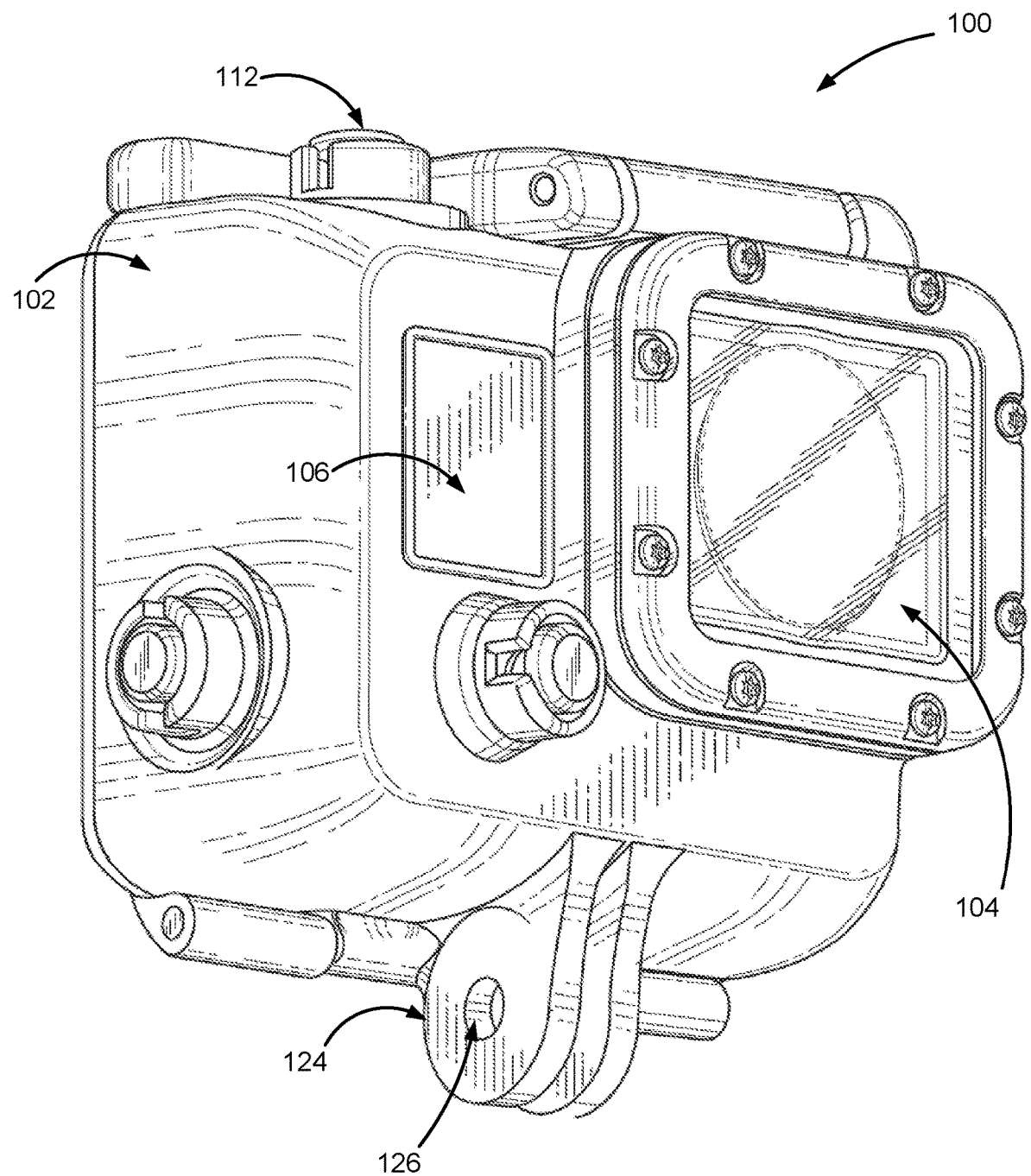
FIG. 1b illustrates another alternative perspective view of a camera system, according to one embodiment.

FIGS. 1a and 1b illustrate various views of a camera system according to one example embodiment. The camera system includes, among other components, a camera housing 100. In one embodiment, a first housing portion 102 includes a front face with four sides (i.e., a top side, bottom side, left side, and right side) structured to form a cavity that receives a camera (e.g. a still camera or video camera). In other embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

In one embodiment, the camera housing 100 has a small form factor (e.g., a height of approximately 2 to 7 centimeters, a width of approximately 2 to 7 centimeters, and a depth of approximately 1 to 5 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may include a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button 112 of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

The front face of the camera housing 100 can include a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens. In this embodiment, the lens window 104 includes a waterproof seal so as to maintain the waterproof aspect of the housing 100.

In one embodiment, the camera housing 100 includes one or more securing structures 120 for securing the camera housing 100 to one of a variety of mounting devices. For example, FIG. 1a illustrates the camera housing secured to a clip-style mount 122. In this example, the camera housing 100 includes a first plurality of protrusions (protrusions 124 as shown in FIG. 1b), and the mount 122 includes a second plurality of protrusions. Each protrusion includes a hole (hole 126 as shown in FIG. 1b) at a similar location within the protrusion such that the first and second pluralities of protrusions can interlock in such a way that the protrusion holes substantially align. Continuing with this example, a turnable handscrew is inserted through the aligned holes, coupling the camera housing 100 to the mount 122 such that the camera housing can pivotally rotate relative to the mount when the turnable handscrew is in a first unlocked position, and such that the camera housing is fixed in position relative to the mount when the turnable handscrew is in a second locked position. In other embodiments, the camera housing 100 can be secured to a different type of mounting structure, and can be secured to a mounting structure via a different type of coupling mechanism.

After securing the housing to the camera mount, the camera mount can in turn be optionally secured to a user's backpack, sports equipment, or body. This allows a user to use the camera for photography (e.g., in a hands-free configuration or manner) without having to physically hold, safeguard, or otherwise physically handle the camera.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

Figure 1C:
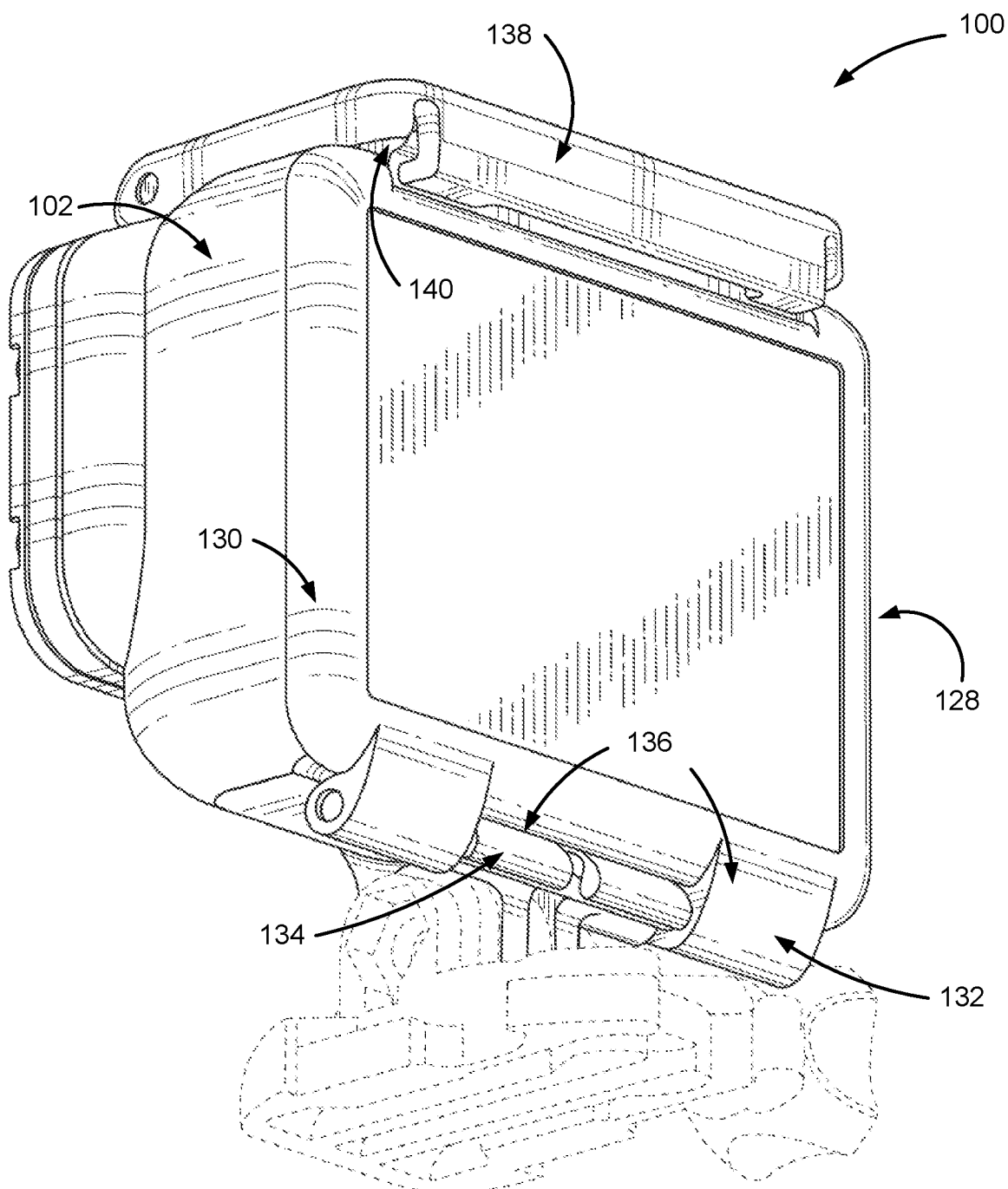
FIG. 1c illustrates a perspective view of a rear of the camera system, according to one embodiment.

FIG. 1c is a rear perspective view of camera housing 100 illustrating a second housing portion 128, according to one example embodiment. The second housing portion 128 detachably couples with the first housing portion 102 opposite the front face of the first housing portion. The first housing portion 102 and second housing portion 128 are collectively structured to enclose a camera within the cavity when the second housing portion 128 is secured to the first housing portion 102 in a closed position.

The second housing portion 128 can include a door 130 that allows the camera to be removed from the housing 100. The door 130 pivots around a hinge 136 that allows the door 130 to be opened or shut. In one embodiment, a first fastening structure 138 located on the top face of the camera housing 100 detachably couples to a second fastening structure 140 on the door 130. The fastening structures 138, 140 secure the door 130 to the first portion 102 of the camera housing 100 in a closed position when coupled, as illustrated in FIG. 2. In one embodiment, the fastening structure 138 includes a hook-shaped lateral bar and the fastening structure 140 comprises an L-shaped bar. The fastening structure 138 can pivot upwards to allow the door 130 to close and can then be pressed down around the fastening structure 140 to hold the door 130 in the closed position. In different embodiments, fastening structures for securing the door 130 can include, for example, a button assembly, a buckle assembly, a clip assembly, a hook and loop assembly, a magnet assembly, a ball and catch assembly, and an adhesive assembly, or any other type of securing mechanism.

In one alternative embodiment, the hinge 136 is instead located on the top face of the housing 100 and the fastening structures 138, 140 are instead located on the bottom face of the housing 100. Alternatively, the hinge 136 and fastening structures 138, 140 may be located on opposite side faces of the camera housing 100.

In one embodiment, the housing 100 includes a watertight seal so that the housing 100 is waterproof when the door 130 is shut. For example, in one embodiment, the door 130 includes a sealing structure positioned on interior edges of the door 130. The sealing structure provides a watertight seal between the first portion of the camera housing 102 and the door 130 when the first securing structure 138 on the top face of the camera housing 100 is coupled to the second securing structure 140 on the top edge of the door 130.

In one embodiment, an outer hinge structure 132 on the bottom edge of the second housing portion 128 detachably couples to an inner hinge structure 134 on the bottom edge of the first housing portion 102 to form the hinge 136. For example, in one embodiment, the outer hinge structure 132 includes one or more hook-shaped protrusions structured to securely fasten to a rod-shaped member of the inner hinge structure 134. Other mechanisms for coupling the second housing portion 128 to the housing 100 may also be used in various alternative embodiments. In other embodiments, the second housing portion 128 may be permanently attached to the first housing portion 102.

Figure 2A:
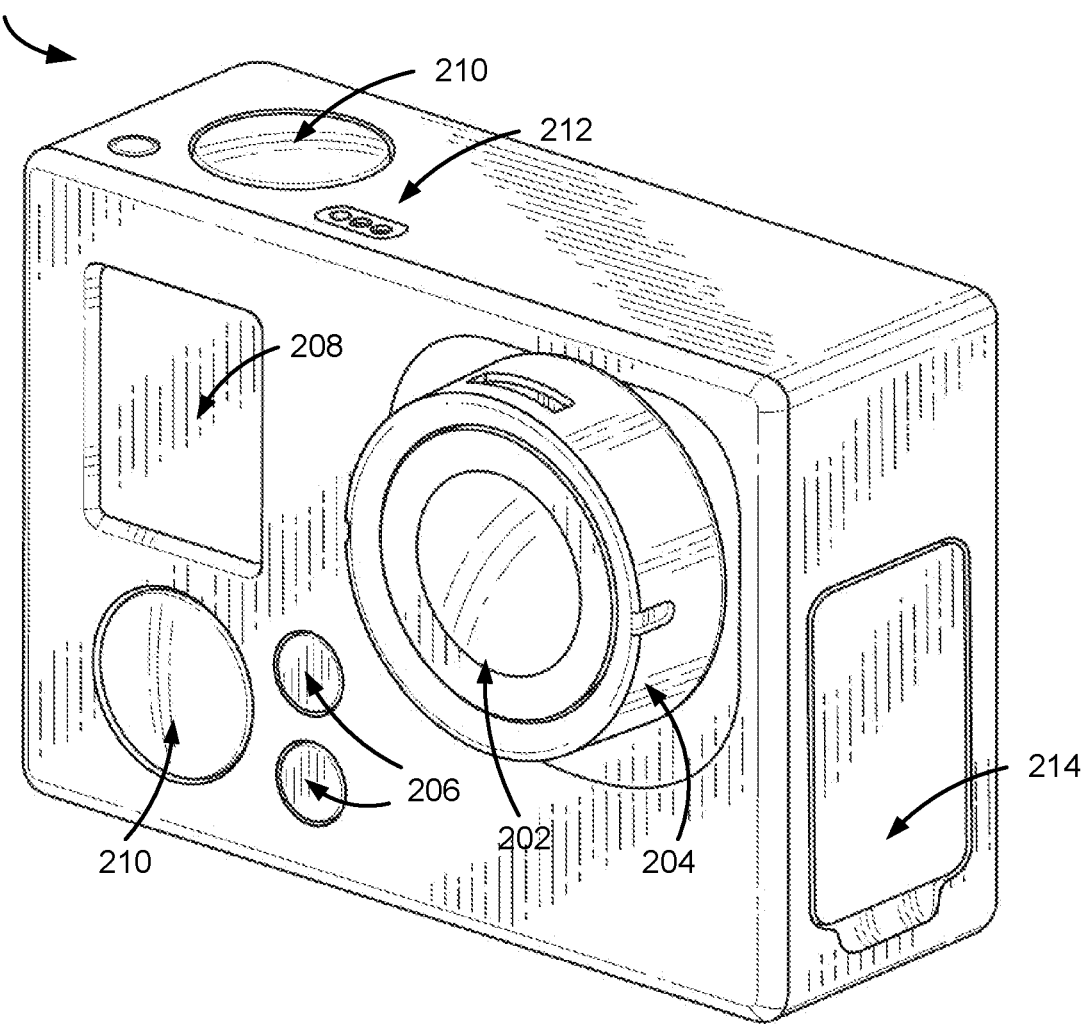
FIG. 2a illustrates a perspective view of a camera for use with the camera system, according to one embodiment.

FIG. 2a illustrates a camera 200 for use with the camera systems described herein, according to one example embodiment. The camera 200 is configured to capture images and video, and to store captured images and video for subsequent display or playback. The camera 200 is adapted to fit within a camera housing, such as the housing 100 discussed above or any other housing described herein. As illustrated, the camera 200 includes a lens 202 configured to receive light incident upon the lens and to direct received light onto an image sensor internal to the lens. The lens 202 is enclosed by a lens ring 204.

The camera 200 can include various indicators, including the LED lights 206 and the LED display 208 shown in FIG. 2a. When the camera 200 is enclosed within the housing 100, the LED display 208 is configured to substantially align with the indicator window 106, and the LED lights 206 are configured to be visible through the housing 100. The camera 200 can also include buttons 210 configured to allow a user of the camera to interact with the camera, to turn the camera on, and to otherwise configure the operating mode of the camera. The camera 200 can also include a microphone 212 configured to receive and record audio signals in conjunction with recording video. The side of the camera 200 includes an I/O interface 214. Though the embodiment of FIG. 2a illustrates the I/O interface 214 enclosed by a protective door, the I/O interface can include any type or number of I/O ports or mechanisms, such as USC ports, HDMI ports, memory card slots, and the like.

Figure 2B:
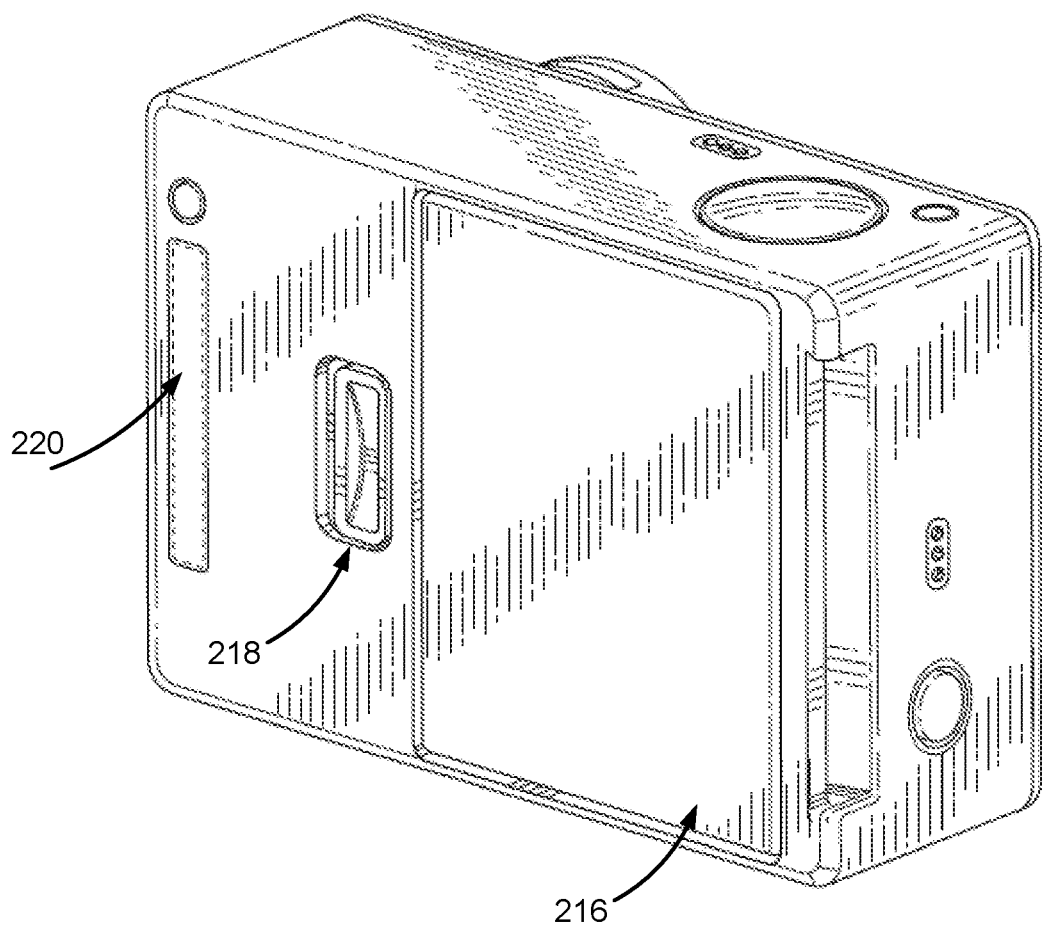
FIG. 2b illustrates a perspective view of a rear of a camera for use with the camera system, according to one embodiment.

FIG. 2b illustrates a perspective view of a rear of a camera 200 for use with the camera system, according to one embodiment. The camera 200 includes a door 216 that covers a removable battery and battery interface. The door 216 can be removed via the door release mechanism 218. The camera also includes an expansion pack interface 220 configured to receive a removable expansion pack, such as a display module, an extra battery module, a wireless module, and the like. Removable expansion packs, when coupled to the camera 200, provide additional functionality to the camera via the expansion pack interface 220.

Example Camera Housing

Figure 3A:
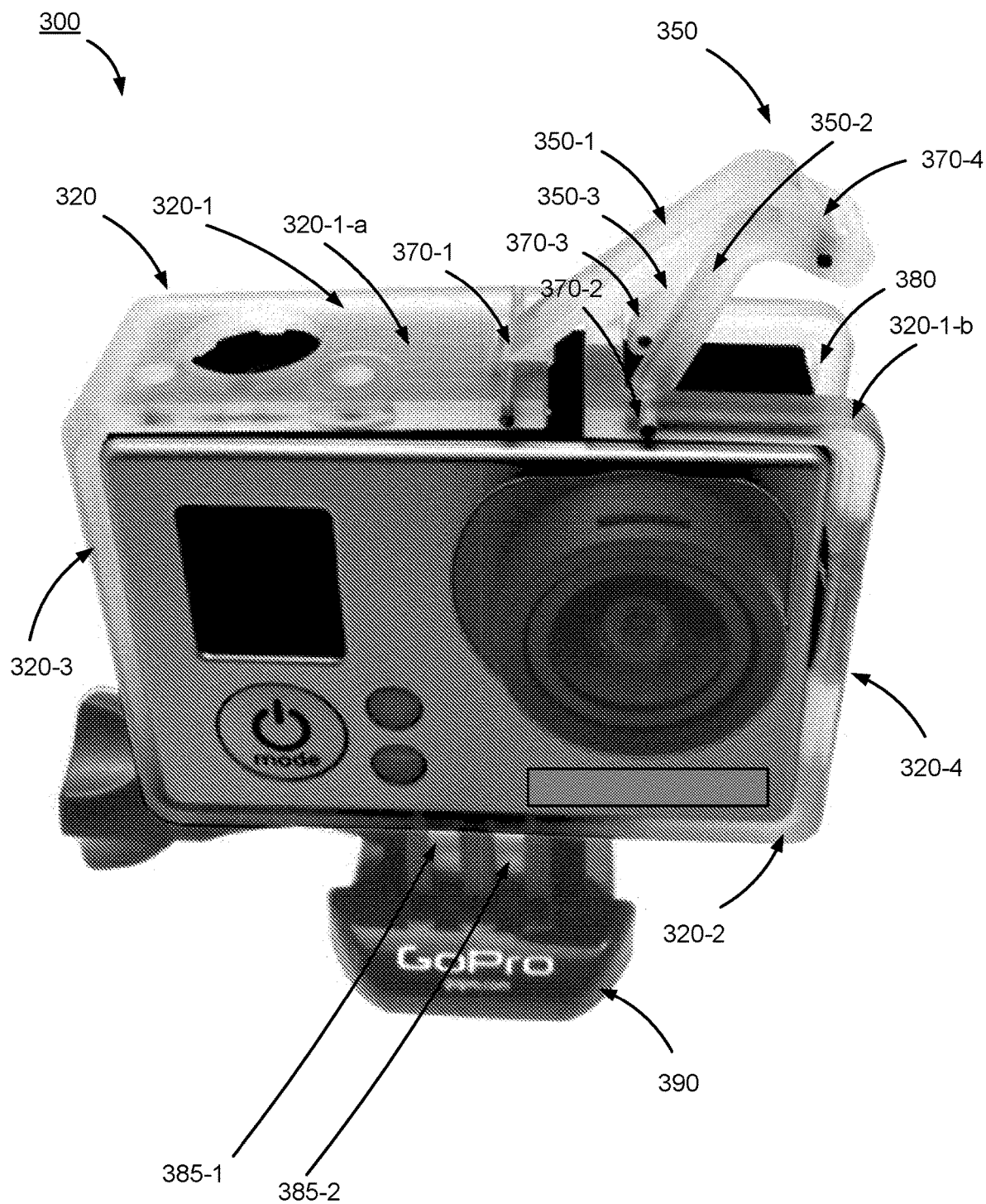
FIG. 3a illustrates a perspective view of a camera housing configured to enclose a camera, according to some embodiments.

FIG. 3a illustrates a perspective view of camera housing 300 configured to enclose a camera, according to some embodiments. As shown in FIG. 3a, the camera housing 300 includes a four-sided frame 320 that is configured to enclose a camera. The camera housing of FIG. 3a securely encloses the camera along the lateral sides of the camera (the top, bottom, left, and right sides) without obscuring the front and rear faces of the camera. The camera housing 300 beneficially does not obstruct the camera lens, any LCD or other displays (front or rear), any optical indicators or buttons, and other user interface elements. To provide additional security to the camera when enclosed by the housing, the camera sides are optionally covered with a layer of material (such as rubber) to provide frictional grip between the camera sides and the inner perimeter of the camera housing in an enclosed position.

As illustrated in FIG. 3a, the camera housing 300 includes the four-sided frame 320, which includes a top side 320-1 (including segment 320-1-a and 320-1-b), a bottom side 320-2, a left side 320-3, and a right side 320-4. In one embodiment, the four-sided frame 320 is of a unibody construction. In an alternate embodiment the four-sided frame 320 can be constructed of one or more segments coupled together (e.g., glued, welded or stitched).

The segment 320-1-a is pivotally coupled to a first latch component, made up of latch-arm 350-1, and the segment 320-1-b is pivotally coupled to a second latch component, made up of latch-arm 350-2 and latch-arm 350-3. The first latch component and the second latch component are pivotally coupled together to form the latch mechanism 350. When the latch mechanism 350 is in a closed position (e.g., as explained further with reference to FIG. 3b and FIG. 4c), the frame securely encloses a camera. When the latch mechanism is in an open position (e.g., as explained further with reference to FIG. 3a and FIG. 4a below), the segment 320-1-a and the segment 320-1-b are separable, allowing for the insertion or removal of a camera. In some conventional camera housing configurations, inserting a camera into or removing a camera from the frame requires the removal of the camera from the camera mount 390. Accordingly, the latch mechanism 350 allows the removal of the camera from the camera housing 320 without requiring the removal of the housing from the camera mount.

Figure 3B:
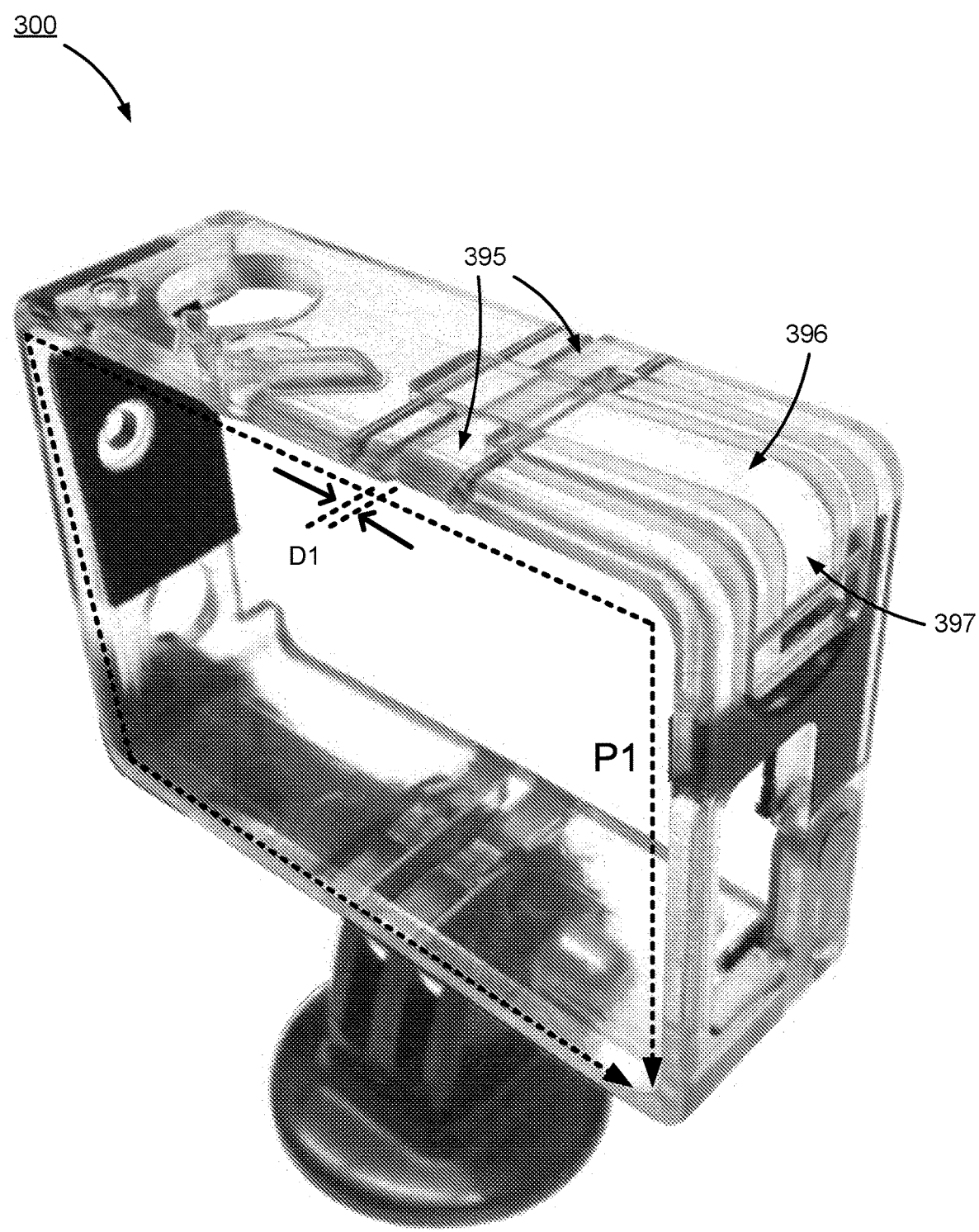
FIG. 3b illustrates a perspective view of a camera housing with a securing latch mechanism, according to some embodiments.

The four-sided frame 320 has a perimeter dimension that allows for the frame to fit the perimeter of the camera as further described with FIG. 3b. For example, in some embodiments, top side has a length of approximately 2 to 7 centimeters, and a width of approximately 1 to 5 centimeters. In some embodiments, latch-arm 350-1 has a length of approximately 3 to 4 centimeters, and a width of approximately 0.25 to 1 centimeters, and the latch-arms 350-2 and 350-3 have lengths of approximately 2 to 3 centimeters, and widths of approximately 0.25 to 1 centimeters.

As shown in FIG. 3a, the latch-arm 350-1 includes a frame-coupled arm-end pivotally (e.g., rotatably) coupled to the segment 320-1-a by a hinge mechanism 370-1. The latch-arm 350-2 and the latch-arm 350-3 each include corresponding frame-coupled arm-ends and pivotally couple to the segment 320-1-b by hinge mechanisms 370-2 and 370-3, respectively. It should be noted that although the latch-arms 350-2 and 350-3 form a single latch component in the embodiment of FIG. 3a, in other embodiments, the latch-arms are separate/non-coupled components. The latch-arm 350-1 is pivotally coupled to the latch-arms 350-2 and 350-3 by hinge mechanism 370-4. The hinge mechanism 370-4 allows the latch-arm 350-1 to pivotally rotate relative to the latch-arms 350-2 and 350-3.

The housing 320 includes a plurality of protrusions (protrusions 385-1 and 385-2) protruding from the bottom side 320-2 of the housing. The protrusions are configured to interlock with mating protrusions of the camera mount 390. It should be noted that although shown on the bottom side 320-2 of the housing, in alternative embodiments, the plurality of protrusions protrude from the left side, the ride side, or the top of the camera housing. Likewise, although the latch mechanism is shown on the top side 320-1 of the camera housing, in alternative embodiments, the latch mechanism is located on a different side of the camera housing, such as the left side or the right side.

The camera housing 300 can be made of a mechanically compliant or pliable material (e.g., such as plastic, resin, or a polycarbonate material), allowing the frame to adequately flex and bend so as to enable insertion of a camera into and out of the frame. The latch components can be made of an electrically non-conductive material (e.g., such as plastic, or resin), to prevent or minimize electrical interference with an antenna located on the camera. In some embodiments, camera housing 300 has a height of approximately 4 to 6 centimeters, a width of approximately 5 to 7 centimeters, and a depth of approximately 1 to 4 centimeters). The camera housing 300 can be made of an optically transparent, substantially transparent, translucent, or opaque material. In some embodiments, camera housing 300 is made of a water-proof or water-resistant material.

FIG. 3b illustrates a perspective view of a camera housing 300 with a securing latch mechanism 350, according to some embodiments. In the closed position, the camera is substantially enclosed by the frame 320 and the inner perimeter of the frame 320 (perimeter P1) is substantially equal to the outer lateral perimeter of the camera. As a result, when the latch mechanism is in the closed position, the camera is securely enclosed inside the camera housing.

As illustrated in FIG. 3b, in the closed position, the latch mechanism 350 is substantially flush with the side 320-1 at location 396 and the side 320-4 at location 397. As a result, in the closed position, the latch is flush with the rest of the frame thereby improving the aesthetic look of the camera housing. Furthermore, the uniform and seamless surface of the frame with the latch in the closed position (e.g., due to the absence of exposed joints or crevices around the latch region) can help ensure that the frame does not physically catch on or entangle with surrounding objects (e.g., other sporting equipment, the user, or objects in the environment).

In some embodiments, rather than being flush with the side 320-1 at location 396 and the side 320-4 at location 397, the latch mechanism 350 protrudes above a surface of side 320-1 at location 396 and above a surface of side 320-4 at location 397. In such embodiments where the latch mechanism 350 is thicker than top side 320-1 of the camera housing 300, the latch mechanism 350 may beneficially provide better reinforcement, strength, and stability and is thus more secure.

Furthermore, when the latch mechanism is in the closed position, the segment 320-1-a and the segment 320-1-b are separated by a first predefined separation distance, D1. When the latch mechanism is in the closed position, the effective perimeter of the frame 320, P1, is substantially equal to a lateral perimeter of the camera. In some embodiments, when the latch mechanism 350 is in the closed position, the segments 320-1-a and 320-1-b are substantially in contact, reducing the effective distance D1 to essentially zero.

Returning to FIG. 3a, the segment 320-1-b includes a segment boundary surrounding a gap 380 configured to receive the latch mechanism 350 in the closed position (e.g., as shown in FIG. 3b) such that, in the closed position, the latch mechanism 350 occupies the gap 380 and is surrounded by the segment boundary. In some embodiments, lengthwise portions of the segment boundary formed along the length of the segment 320-1-b are rigidly connected by a widthwise supporting member (member 395 of FIG. 3b), thereby securing a fixed separation between the lengthwise portions of the segment boundary. This makes it possible for the latch mechanism 350 to open without pushing the segment boundaries laterally outward, thereby constraining the top side of the frame in its original shape in a lateral direction.

Figure 4A:
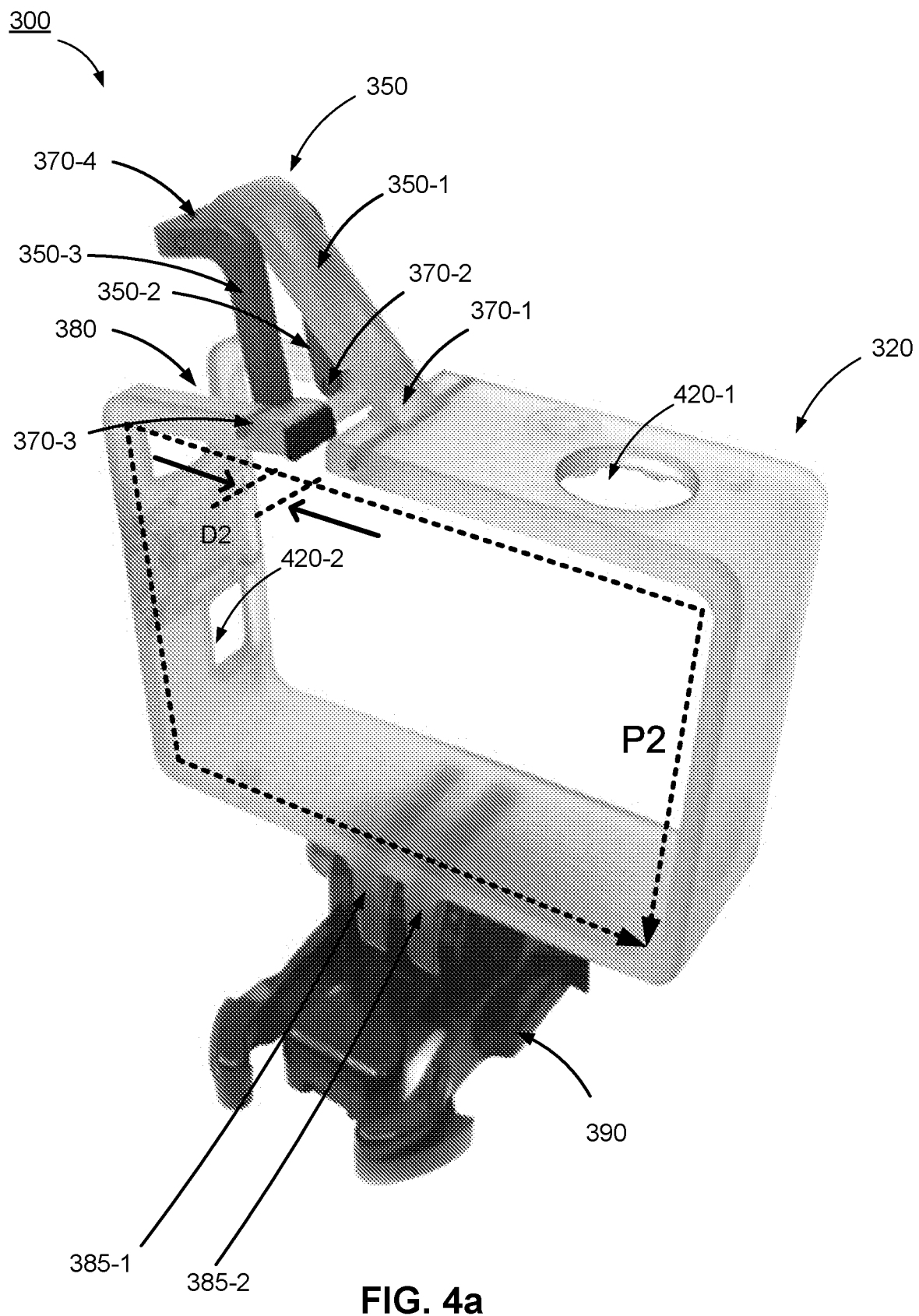
FIG. 4a illustrates a perspective view of a camera housing with a latch mechanism, according to some embodiments.

FIG. 4a illustrates another perspective view of camera housing 300 with latch mechanism 350, according to some embodiments. In the open position, the latch mechanism 350 is lifted outward from the frame 320, thereby allowing the segment 320-1-a and the segment 320-1-b to separate from each other. With segments 320-1-a and 320-1-b separated, the inner perimeter of the frame 320 is enlarged to an effective perimeter, P2, larger than the outer lateral perimeter of the camera, thereby allowing insertion or removal of the camera into or out of the frame. The space D2 between segments 320-1-a and 320-1-b increases or decreases when the latch mechanism is in the open position as the latch arm 350-1 pivotally rotates relative to the latch-arms 350-2 and 350-3.

In some embodiments, camera housing 300 further includes one or more respective openings (e.g., openings or apertures 420-1 and 420-1) to accommodate one or more of: a camera power button, a data port, a microphone interface, and the like. These openings on the frame align with corresponding camera features when the camera is securely enclosed within the housing, allowing for convenient access to camera functionality without having to remove the camera from the housing.

Figure 4B:
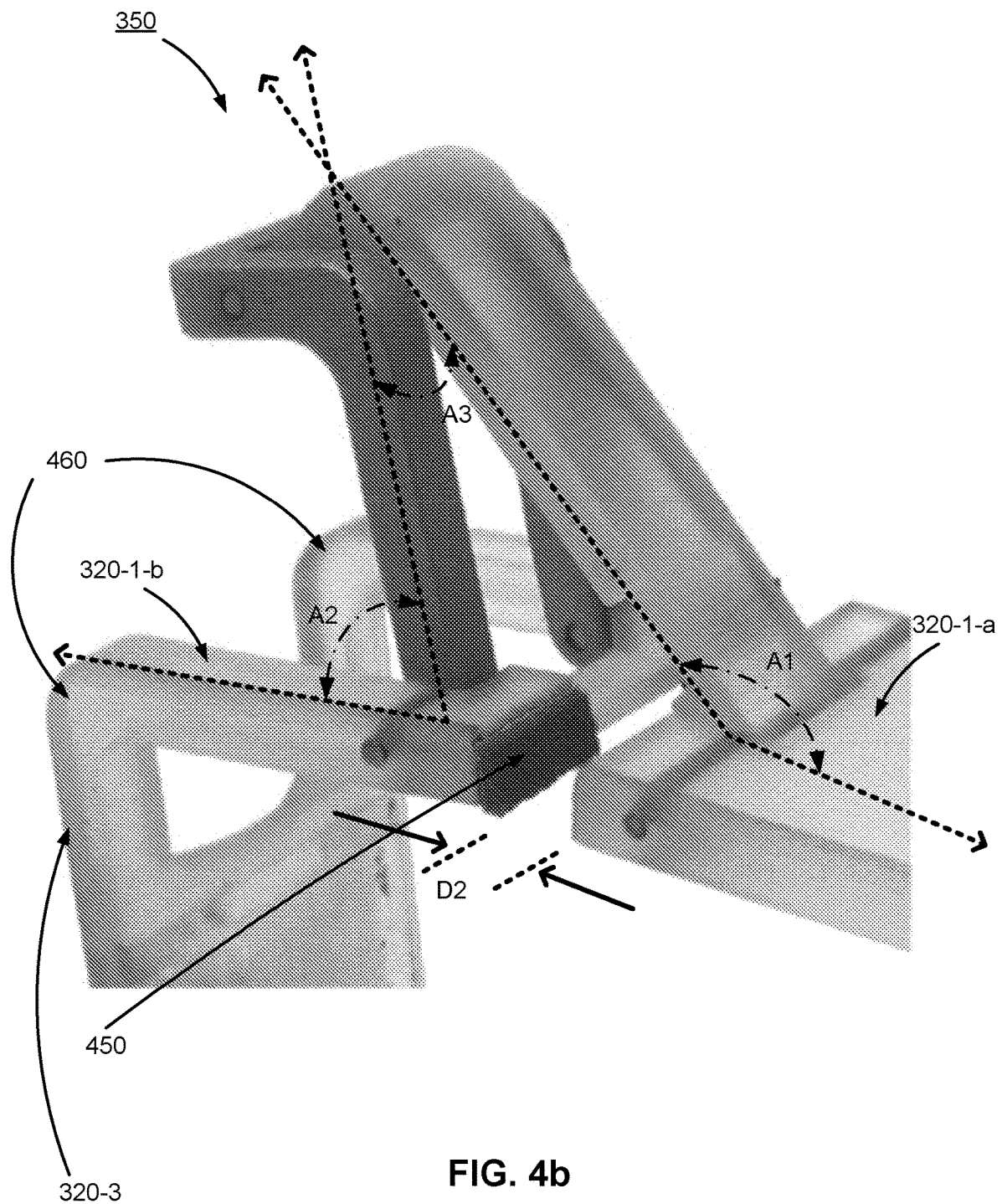
FIG. 4b illustrates a close-up perspective view of a latch mechanism in an open position, according to some embodiments.

FIG. 4b illustrates a close-up perspective view of latch mechanism 350 in an open position, according to some embodiments. As shown in FIG. 4b, the latch components 350-1, 350-2, and 350-3 each form an angular separation relative to the top side of the frame 320. In some embodiments, latch-arm 350-1 forms an angular separation A1 with respect to the top side of the frame 320, latch-arm 350-2 forms an angular separation A2 with respect to the top side of the frame 320, and latch-arm 350-1 forms an angular separation A3 with respect to latch-arm 350-2. As the latch mechanism 350 is moved from the closed position to the open position, the angles A2 and A3 increase, and A1 decreases. Likewise, as the segments 320-1-a and 320-1-b are separated, causing latch-arm 350-1 to pivot angularly away from latch-arms 350-2 and 350-3, the angle A3 increases.

Figure 4C:
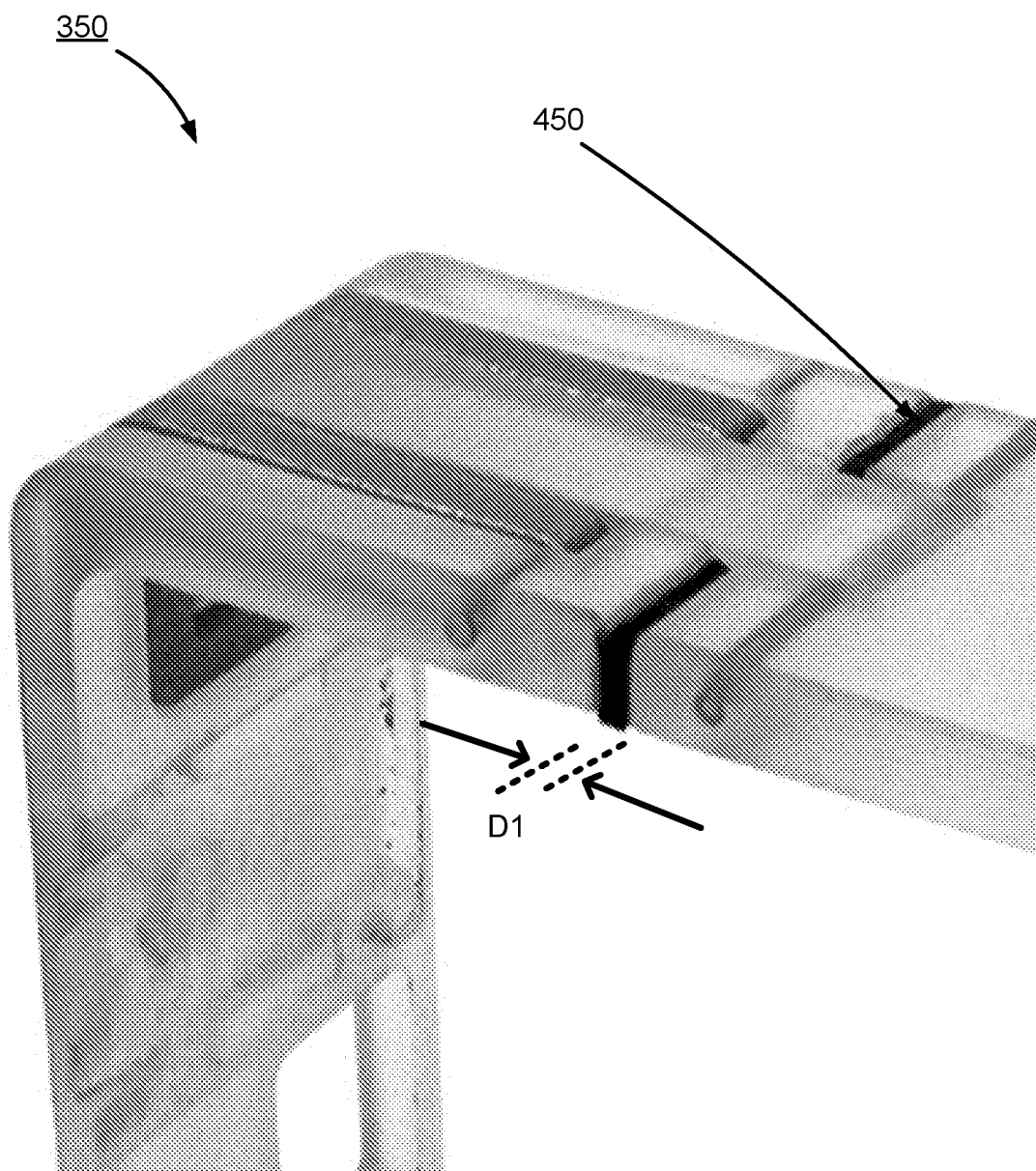
FIG. 4c illustrates a close-up perspective view of a latch mechanism in a closed position, according to some embodiments.

FIG. 4c illustrates a close-up perspective view of latch mechanism 350 in a closed position, according to some embodiments. As shown in FIG. 4c, in the closed position, the segment 320-1-a and the segment 320-1-b are separated by the distance D1. As illustrated in FIGS. 4b-4c, at least a portion of the segment 320-1-b terminates in a slice 450 of compressible material (e.g., a piece of rubber) configured to seal a gap, if present, between the segments 320-1-a and 320-1-b when the latch mechanism is in the closed position.

As shown in FIGS. 4b-4c, the latch components 350-1, 350-2 and 350-3 include a substantially right-angled bend configured to fold over a corner 460 adjacent to the second segment 320-1-b. The right-angled bend allows the latch mechanism to be flush with the top side of the housing, the adjacent side of the housing, and the corner of the housing where the top side and the adjacent side intersect.

Figure 5A:
FIGS. 5a-5c illustrate perspective views of a camera housing with a foldable handle mechanism configured to serve as a securing arm, according to some embodiments.
Figure 5B:
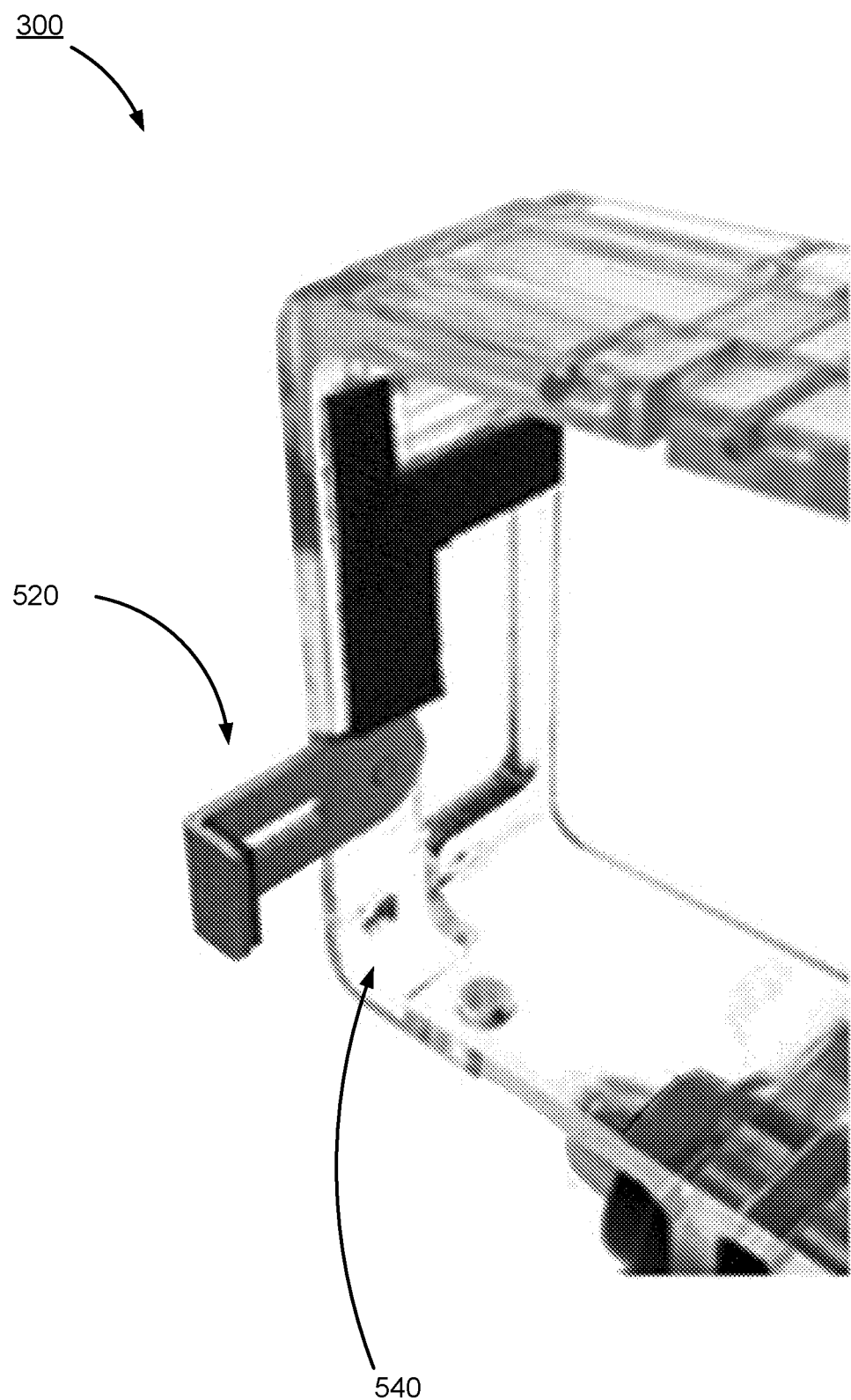
Figure 5C:
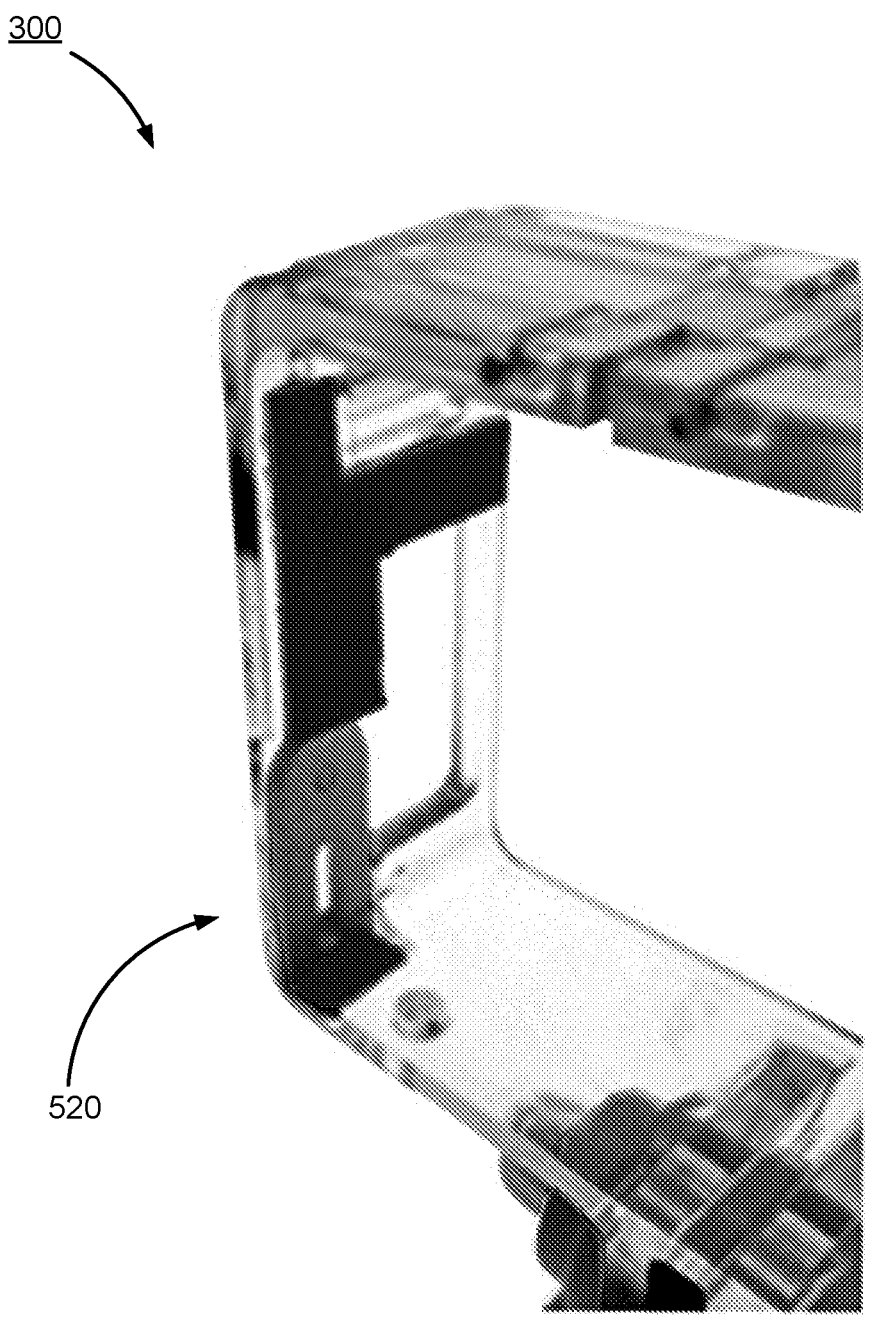

FIGS. 5a-5c illustrate perspective views of a camera housing 300 with a foldable handle mechanism 520 configured to serve as a securing arm, according to some embodiments. In some embodiments, foldable handle 520 serves as a securing retainer configured to accommodate and secure extension modules coupled to a camera body. The foldable handle 520 includes a first arm 530-1 and a second perpendicular arm 530-2, pivotally coupled to a side of the camera housing. FIG. 5b illustrates the handle 520 in a first position configured to secure a camera and coupled extension module. The camera housing can include a reciprocal indentation 540 configured to accommodate the handle when folded downward into a second position (as illustrated in FIG. 5c). The reciprocal indentation allows the handle to be flush with the inside walls of the camera housing when in the second position.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera housing as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A camera housing, comprising:
   a first housing portion having four sides that form a first portion of a cavity to receive a camera,
   a second housing portion having four sides that form a second portion of the cavity to receive the camera, wherein a front face of the camera and a rear face of the camera are exposed when side faces of the camera are enclosed within the cavity;
   a button on the first housing portion or the second housing portion that is configured to allow a user to manipulate a corresponding button on the camera that is associated with camera functionality;
   a first fastening structure pivotally coupled to a first side of the first housing portion;
   a second fastening structure positioned on a first side of the second housing portion,
      wherein the first fastening structure is configured to detachably couple the second fastening structure to form a latch, and
      wherein the latch is configured to secure the second housing portion to the first housing portion;
   a first hinge structure coupled to a second side of the first housing portion;
   a second hinge structure coupled to a second side of the second housing portion, wherein the second hinge structure is configured to couple to the first hinge structure to form a hinge that allows the second housing portion to rotate in respect to the first housing portion; and
   a securing structure having securing protrusions extending from the first housing portion, the securing protrusions configured to interlock with corresponding mounting protrusions extending from a camera mount.

2. The camera housing of claim 1, wherein the first fastening structure comprises a hook-shaped bar and the second fastening structure comprises an L-shaped bar, and wherein the first sides are parallel to the second sides.

3. The camera housing of claim 2, wherein the camera housing is configured to securely enclose the camera within the cavity when the second housing portion is secured to the first housing portion in a closed position, and wherein the camera is insertable into and removable from the camera housing when the first side of the second housing portion is spaced from the first side of the first housing portion in an open position.

4. The camera housing of claim 2, wherein the camera mount comprises mounting structure to secure the coupled camera housing and camera mount to at least one of a user's body, a user's backpack, or sports equipment such that the user can operate the camera in a hands-free manner.

5. The camera housing of claim 1, wherein the button on the first housing portion or the second housing portion is formed of pliable material configured to allow the user to manipulate the corresponding button on the camera through pliable material.

6. The camera housing of claim 5, comprising:
   an exposed area on the first housing portion or the second housing portion, the exposed area configured to allow a user to manipulate another button on the camera that is associated with camera functionality or access an I/O interface or microphone interface of the camera when the camera is securely enclosed within the camera housing.

7. The camera housing of claim 5, wherein the securing protrusions and the mounting protrusions include holes that align when the securing protrusions and the mounting protrusions are interlocked such that a turnable handscrew can be inserted through the aligned holes to couple the camera housing to the camera mount.

8. The camera housing of claim 7, wherein the camera housing can pivotally rotate relative to the camera mount when the turnable handscrew is in an unlocked position and the camera housing is fixed in position relative to the camera mount when the turnable handscrew is in a locked position.

9. The camera housing of claim 5, comprising:
   one or more indicator windows on the first housing portion or the second housing portion, wherein the one or more indicator windows are configured to substantially align with one or more corresponding camera indicators on the camera when the camera is disposed in the cavity of the camera housing, and wherein the one or more indicator windows are formed from a transparent or translucent material.

10. The camera housing of claim 1, wherein the second hinge structure is configured to detachably couple to the first hinge structure such that the second housing portion is removable from the first housing portion.

11. A camera system, comprising:
    a camera, comprising:
       an image sensor;
       a lens configured to direct received light onto the image sensor;
       a visible indicator; and
       a button configured to allow a user of the camera to interact with the camera;
    a housing, comprising:

a main body having four sides that form a cavity to receive the camera;

an indicator window on one of the sides of the main body, the indicator window configured to substantially align with the visible indicator on the camera when the camera is disposed in the cavity of the main body;

a door configured to couple to the main body, wherein a front face of the camera and a rear face of the camera are exposed when side faces of the camera are enclosed within the cavity;

a first fastening structure pivotally coupled to a top side of the main body;

a second fastening structure positioned on a top side of the door, wherein the first fastening structure is configured to detachably couple the second fastening structure to secure the top side of the door to the top side of the main body;

a first hinge structure coupled to a bottom side of the main body;

a second hinge structure coupled to a bottom side of the door, wherein the second hinge structure is configured to couple to the first hinge structure to form a hinge that allows the door to rotate in respect to the main body; and a securing structure having securing protrusions extending from the bottom side of the main body; and a mount, comprising:

mounting protrusions including holes that align with holes in the securing protrusions when the mounting protrusions and the securing protrusions are interlocked;

a turnable handscrew configured for insertion through the aligned holes in the securing protrusions and the mounting protrusions to couple the mount to the housing; and mounting structure configured to secure the coupled mount and housing to at least one of a user's body, a user's backpack, or sports equipment such that the user can operate the camera in a hands-free manner.

12. The camera system of claim 11, wherein the housing comprises:

an exposed area in the main body, the exposed area configured to allow the user to manipulate the button on the camera or access an I/O interface or microphone interface of the camera when the camera is securely enclosed within the housing.

13. The camera system of claim 11, wherein the housing comprises:

a button on the housing configured to allow a user to manipulate the button on the camera, wherein the button on the housing is formed from pliable material configured to allow the user to manipulate the button on the camera through the pliable material, and wherein the button on the camera is a shutter button, a power button, or an operating mode button.

14. The camera system of claim 11, wherein the housing can pivotally rotate relative to the mount when the turnable handscrew is in an unlocked position, and wherein the housing is fixed in position relative to the mount when the turnable handscrew is in a locked position.

15. The camera system of claim 11, wherein the visible indicator is an LED, LCD, or other display, and wherein the indicator window is formed from a transparent or translucent material.

16. The camera system of claim 15, wherein the second hinge structure is configured to detachably couple to the first hinge structure such that the door is removable from the main body.

17. The camera system of claim 11, comprising:

an expansion module configured to attach to the housing to add expanded features to the camera.

18. A camera housing, comprising:

a main body having four sides that form a cavity to receive a camera, a door that is detachably coupled to the main body to secure the camera in the cavity, wherein a front face of the camera and a rear face of the camera are exposed when the camera is secured by the door;

an exposed area in the main body, the exposed area configured to allow a user to manipulate a button on the camera that is associated with camera functionality or access an I/O interface or microphone interface of the camera when the camera is securely enclosed within the camera housing;

an indicator window on the main body, the indicator window configured to substantially align with a visible indicator on the camera when the camera is disposed in the cavity of the main body;

a latch configured to detachably secure a first side of the door to a first side of the main body;

a hinge configured to couple a second side of the door to a second side of the main body and to allow the door to rotate in respect to the main body; and securing protrusions extending from the main body, the securing protrusions configured to interlock with corresponding mounting protrusions extending from a camera mount.

19. The camera housing of claim 18, wherein the hinge comprises an inner hinge structure disposed on an edge of the second side of the main body and an outer hinge structure disposed on an edge of the second side of the door, the outer hinge structure configured to detachably couple to the inner hinge structure.

20. The camera housing of claim 19, wherein the outer hinge structure comprises hook-shaped protrusions and the inner hinge structure comprises a rod-shaped member, and wherein the hook-shaped protrusions are structured to securely fasten to the rod-shaped member.

* * * * *